(12) United States Patent
Chmelicek et al.

(10) Patent No.: US 11,005,321 B2
(45) Date of Patent: May 11, 2021

(54) MOTOR

(71) Applicants: Petr Chmelicek, Nottingham (GB); Ashish Goel, Nottingham (GB)

(72) Inventors: Petr Chmelicek, Nottingham (GB); Ashish Goel, Nottingham (GB)

(*) Notice: Subject to any disclaimer, the term of this patent is extended or adjusted under 35 U.S.C. 154(b) by 196 days.

(21) Appl. No.: 16/174,530

(22) Filed: Oct. 30, 2018

(65) Prior Publication Data
US 2019/0173342 A1 Jun. 6, 2019

(30) Foreign Application Priority Data
Oct. 30, 2017 (GB) .................................. 1717871

(51) Int. Cl.
H02K 21/00 (2006.01)
H02K 1/27 (2006.01)
H02K 19/26 (2006.01)
H02K 19/12 (2006.01)
H02K 1/26 (2006.01)
H02K 16/02 (2006.01)

(52) U.S. Cl.
CPC ............ *H02K 1/2766* (2013.01); *H02K 1/26* (2013.01); *H02K 1/2713* (2013.01); *H02K 1/2753* (2013.01); *H02K 1/2786* (2013.01); *H02K 19/12* (2013.01); *H02K 19/26* (2013.01); *H02K 16/02* (2013.01); *H02K 2201/06* (2013.01)

(58) Field of Classification Search
CPC .......................... H01F 7/0273; H02K 1/2766
See application file for complete search history.

(56) References Cited

U.S. PATENT DOCUMENTS

| 3,334,254 A | 8/1967 | Kober |
| 4,127,786 A | 11/1978 | Volkrodt |
| 4,481,437 A | 11/1984 | Parker |
| 4,725,750 A | 2/1988 | Welch |
| 5,034,715 A | 7/1991 | Leupold |
| 5,952,758 A | 9/1999 | Lucidarme et al. |

(Continued)

FOREIGN PATENT DOCUMENTS

| CN | 102761211 A | 10/2012 |
| DE | 10 2013 225238 A1 | 6/2015 |

(Continued)

OTHER PUBLICATIONS

Atallah, K and Wang, J .A rotor with axially and circumferentially magnetized permanent magnets, IEEE Transactions on Magnetics, Nov. 2012, pp. 3230-3233.

*Primary Examiner* — Ramon M Barrera
(74) *Attorney, Agent, or Firm* — Maschoff Brennan

(57) ABSTRACT

The current invention relates to a magnetic pole assembly, providing flux to an air gap, comprising one or more magnetic pole pieces and one or more sources of magnetic flux. Said one or more sources of magnetic flux lie adjacent to the axial faces and circumferential faces and one of the radially inner face or radially outer face of each magnetic pole piece. Thereby to allow flux created by said one or more sources of magnetic flux to enter the one or more magnetic pole pieces in order to focus the magnetic flux of said pole piece towards and out of the radial surface not having a source of magnetic flux adjacent thereto. Such an arrangement, increases the flux density in the air gap adjacent to said radial surface not having a source of magnetic flux adjacent thereto.

20 Claims, 13 Drawing Sheets

(56) References Cited

U.S. PATENT DOCUMENTS

| | | |
|---|---|---|
| 6,144,132 A | 11/2000 | Nashiki |
| 6,323,672 B1 | 11/2001 | Starr |
| 6,653,920 B1 * | 11/2003 | Chen .................... H01F 7/0205 335/296 |
| 6,833,647 B2 | 12/2004 | Saint-Michel et al. |
| 7,911,103 B2 | 3/2011 | Saint-Michel |
| 2005/0127769 A1 | 6/2005 | Minagawa |
| 2005/0179337 A1 | 8/2005 | Hasebe et al. |
| 2006/0097594 A1 | 5/2006 | Abou-Akar et al. |
| 2009/0009022 A1 | 1/2009 | Saint-Michel |
| 2011/0050025 A1 | 3/2011 | Doushita et al. |
| 2012/0134820 A1 | 5/2012 | Vance et al. |
| 2012/0139379 A1 | 6/2012 | Ge et al. |
| 2012/0228976 A1 | 9/2012 | Petro et al. |
| 2012/0228978 A1 | 9/2012 | Petro et al. |
| 2013/0043754 A1 | 2/2013 | Zhu et al. |
| 2013/0134820 A1 | 5/2013 | Zhu et al. |
| 2013/0241335 A1 | 9/2013 | Vollmer |
| 2014/0375162 A1 | 12/2014 | Kim et al. |
| 2016/0247616 A1 | 8/2016 | Smith et al. |
| 2016/0365763 A1 | 12/2016 | Sakurai et al. |
| 2017/0070111 A1 | 3/2017 | Kanda et al. |
| 2019/0103791 A1 | 4/2019 | Goel et al. |
| 2019/0131838 A1 | 5/2019 | Chmelicek et al. |
| 2019/0341828 A1 | 11/2019 | Calverley et al. |
| 2019/0352774 A1 | 11/2019 | Chan et al. |

FOREIGN PATENT DOCUMENTS

| | | |
|---|---|---|
| EP | 1003267 A2 | 5/2000 |
| EP | 1416618 A1 | 5/2004 |
| EP | 1 969 696 A1 | 9/2008 |
| GB | 2567316 | 4/2019 |
| JP | 2016046897 A | 4/2016 |
| JP | 2016082733 A | 5/2016 |

* cited by examiner

MOTOR

BACKGROUND OF THE INVENTION

The present invention is related to rotating electrical machines and relates particularly but not exclusively to a radial field electric motor and a rotor arrangement for such a motor which focuses the magnetic flux produced.

Magnetic flux focusing in rotors of rotating electric machines employing magnets as a source of excitation can be realised using various magnetic circuit arrangements (topologies, designs). The purpose of flux focusing is to achieve high magnetic flux density in the air gap between the stator and rotor, possibly even higher than remanent flux density of magnets. Boulder Wind Power, Inc. (US2016247616 (A1): 2016-08-25) introduced several different magnet and pole piece arrangements, utilizing concepts of flux focusing, which can be incorporated in various electrical machine topologies. Traditionally, flux focusing in radial field electrical machines is realized using one or more magnet arrays embedded in rotor made of laminated electrical steel. Well known practical realisations are spoke or V type rotor topologies where consecutive magnets are magnetised so that they oppose each other. In spoke arrangement, the magnets are magnetised in circumferential direction while in V type rotor, flux leaving the magnets has circumferential and radial component. Additional magnets magnetised in radial direction could be added to both topologies in order to limit flux leakage and further boost the air gap flux density. Examples of radial flux focused rotor are disclosed in: Meidensha Electric Mfg Co. Ltd (JP2016082733 (A): 2016-05-16), Wolfgang Volkrodt (U.S. Pat. No. 4,127,786 (A): 1978-11-28), Samsung Electronics Co. Ltd. (US2014375162 (A1): 2014-12-25) and JTEKT CORP (JP2017055493 (A): 2017-03-16). While spoke type topology is an example of one dimensional flux focusing having magnets providing flux only circumferential direction, V type rotor can be seen as two dimensionally focused since magnets provide flux in circumferential as well as radial direction. Two-dimensional flux focusing can also be realised by combining an array of circumferentially magnetised magnets with and array of magnets magnetised in the direction of rotor's axis of rotation (axially magnetised magnets). This concept is disclosed by K. Atallah and J. Wang (A rotor with axially and circumferentially magnetized permanent magnets, IEEE Transactions on Magnetics, November 2012). Magnetic flux generated by both arrays of magnets is guided towards the electrical machine air gap by magnetic pole pieces. Since the magnetic flux enters the pole piece in circumferential and axial direction and leaves it in radial direction, the flux path is distinctly three dimensional. Similarly, magnetic end plates, providing return path for flux generated by the axially magnetised magnets, guide flux in three-dimensional fashion.

It was shown by K. Atallah and J. Wang (A rotor with axially and circumferentially magnetized permanent magnets, IEEE Transactions on Magnetics, November 2012) that for the two-dimensional flux focusing arrangements, the flux density in the air gap is highest when the axial length of the rotor is short. This is because of the contribution from axially magnetised magnets. For many applications, it is required to have a rotor with small outer diameter and high axial length (for example, if low inertia is required).

The present invention introduces a concept of three-dimensional flux focusing for rotors of electrical machines. Magnetic field in the pole pieces of an electrical machine rotor is excited by magnetic flux sources providing flux in all three directions in such a way that three-dimensional flux focusing is achieved. Due to the three-dimensional flux focusing, air gap flux density can be substantially higher than remanent flux density of magnets employed in the rotor, thus making it possible to use low cost non-rare earth magnets with low remanent flux density. Furthermore, sources of magnetic flux prevent flux leakage from pole pieces in their respective direction since they actively oppose it. This is of particular benefit in case of flux leaking in radial direction through rotor hub/shaft which would normally need to be made of non-magnetic and potentially expensive material. The three-dimensional flux focusing eliminates this problem by minimizing radial flux leakage. Since the pole pieces and rotor hub can be made of the same magnetic material, they can also be manufactured as a single body, reducing the number of components in the assembly. It is also shown how a single piece magnet can be used to provide flux in all the three directions, with a benefit of significantly reducing the number of components to assemble and constrain.

The concept of three-dimensional flux focusing makes it possible to achieve high air gap flux densities in electrical machines equipped with this rotor despite using weak sources of magnetic flux. Consequently, low cost permanent magnets such as ferrites can be employed instead of high-performance rare earth based permanent magnets which are currently prevalent but suffer from supply chain issues and are substantially more expensive. Electrical machines using this concept show potential to achieve similar efficiency and power density to rare earth based electrical machines, and improved performance over current state-of-the-art (SoA) non-rare earth technologies. Because of this, the presented rotor technology is particularly suitable for applications where high performance, low cost and robustness is required. Additionally, stable supply of ferrite magnets enables relatively low risk high volume production. Due to all these benefits, the invention has the potential to accelerate wide spread adoption of environmentally friendly technologies. Among applications which are most likely to benefit from the present invention are reduced or zero emission automotive traction and renewable power generation.

The invention discloses the concept of flux focusing in all the three dimensions around the magnetic poles of the rotor in order to improve the density of flux through the poles and hence the performance of the rotor. This is achieved using novel magnet topology or arrays of magnets such that when put together, provide flux in the circumferential, axial as well as radial directions of the rotor and focuses the flux through the magnetic poles of the rotor.

BRIEF SUMMARY OF THE INVENTION

According to a first aspect of the present invention a magnetic pole assembly is provided providing flux to an air gap G, comprising one or more magnetic pole pieces and one or more sources of magnetic flux. Each magnetic pole piece includes a first axial face, a second axial face, a first circumferential face, a second circumferential face, a radially inner surface, and a radially outer surface. The one or more sources of magnetic flux may lie adjacent to each of the first axial face and the second axial face, the first circumferential face and the second circumferential face and adjacent to one of the radially inner surface, or the radially outer surface. Such an arrangement will allow flux created by said source of magnetic flux to enter the one or more magnetic pole pieces which then focus the magnetic flux towards and out of the radial surface not having a source of magnetic flux adjacent thereto. As such, this arrangement is able to focus the magnetic flux in a manner not known in the art.

The one or more sources of magnetic flux may lie adjacent the radially inner surface of a respective magnetic pole piece but not said radially outer surface.

The one or more sources of magnetic flux may lie adjacent the radially outer surface of a respective magnetic pole piece but not said radially inner surface.

The one or more sources of magnetic flux may be permanent magnets.

The sources of magnetic flux may be electro-magnets comprising coils. The coils may be provided with a source of electric current for passage through said coils.

When the magnetic pole assembly comprises a plurality of magnetic pole pieces and sources of magnetic flux, the magnetic pole pieces may be arranged in a circular array around an axis of rotation X to form a rotor unit having plurality of magnetic pole pieces. The consecutive pole pieces in the circular array may have alternating magnetic polarity. A first of said one or more sources of magnetic flux may comprise individual circumferentially and radially extending first and second axial segments adjacent respective first and second axial faces. The Magnetic pole assembly may further include first and second circumferentially extending magnetic end plates. Said end plates may have a first face adjacent respective first and second segments providing a return path for flux generated by the axially magnetised magnets, thereby to guide flux in a three-dimensional fashion.

When the magnetic pole assembly comprises a plurality of magnetic pole pieces and sources of magnetic flux, the magnetic pole pieces may be arranged in a circular array around an axis of rotation X to form a rotor unit having plurality of magnetic pole pieces. The consecutive pole pieces in the circular array may have alternating magnetic polarity. A second of said one or more sources of magnetic flux may comprise a plurality of individual axially and radially extending first and second circumferential segments adjacent respective first and second circumferential faces.

A magnetic pole assembly may comprise a plurality of magnetic pole pieces and sources of magnetic flux. The magnetic pole pieces may be arranged in a circular array around an axis of rotation X to form a rotor unit having plurality of magnetic pole pieces. The consecutive pole pieces in the circular array may have alternating magnetic polarity. A third of said one or more sources of magnetic flux may comprise a plurality of individual circumferentially and axially extending first or second radial segments adjacent respective first or second radial faces.

A magnetic pole assembly may include a first of said sources of magnetic flux. The first source of magnetic flux may comprise axially magnetised magnets having a north side N and a south side S displaced axially along Axis X from each other.

A magnetic pole assembly may include a second of said sources of magnetic flux. The second of said sources of magnetic flux may comprise circumferentially magnetised magnets having a north side N and a south side S displaced circumferentially around axis X relative to each other.

A magnetic pole assembly may include a third of said sources of magnetic flux. The third of said sources of magnetic flux may comprise radially magnetised magnets having a north side N and a south side S displaced radially relative to each other.

In a magnetic pole assembly said second and third sources of magnetic flux may comprise a single unitary structure having a pair of said individual axially and radially extending first and second circumferential segments and a single axially and circumferentially extending radial segment.

In a magnetic pole assembly said first and third sources of magnetic flux may comprise a single unitary structure having a pair of individual circumferentially and radially extending first and second axial segments and a single axially and circumferentially extending radial segment.

In a magnetic pole assembly said first and second sources of magnetic flux comprise a single unitary structure having a pair of circumferentially and radially extending first and second axial segments and a pair of axially and radially extending first and second circumferential segments.

In a magnetic pole assembly said first, second and third sources of magnetic flux comprise a single unitary stricture having a pair of individual circumferentially and radially extending first and second axial segments a pair of axially and radially extending first and second circumferential segments and a single axially and circumferentially extending radial segment.

In a magnetic pole assembly, each pole piece may include a pole shoe extending away from a radial surface. The pole shoe may not have a radial source of magnetic flux adjacent thereto. The said pole shoe may include a pole face which is both radially and circumferentially offset relative to the pole piece.

A magnetic pole assembly may include a stator having a plurality of electro magnets disposed in a circumferential direction C around said central axis X. Said stator may have a radial surface facing the radially outer surface of said pole piece.

A magnetic pole assembly may include a stator having a plurality of electro magnets disposed in a circumferential direction C around said central axis X. Said stator may have a radial surface facing the radially inner surface of said pole piece.

A magnetic pole assembly may include an axially extending tubular structure of magnetic material extending between said plurality of individual circumferentially and axially extending first or second radial segments.

BRIEF DESCRIPTION OF THE SEVERAL VIEWS OF THE DRAWING

The present invention will now be described, by way of example only, with reference to the accompanying drawings, in which:

FIG. 9b shows an axial section view of the electric motor of FIG. 9a

FIG. 10b shows an axial section view of the electric motor of FIG. 10a

DETAILED DESCRIPTION OF THE INVENTION

The present invention is related to three-dimensional flux focused poles able to create flux density in excess of 1 Tesla in the air gap of electrical machines.

Figure 1A:
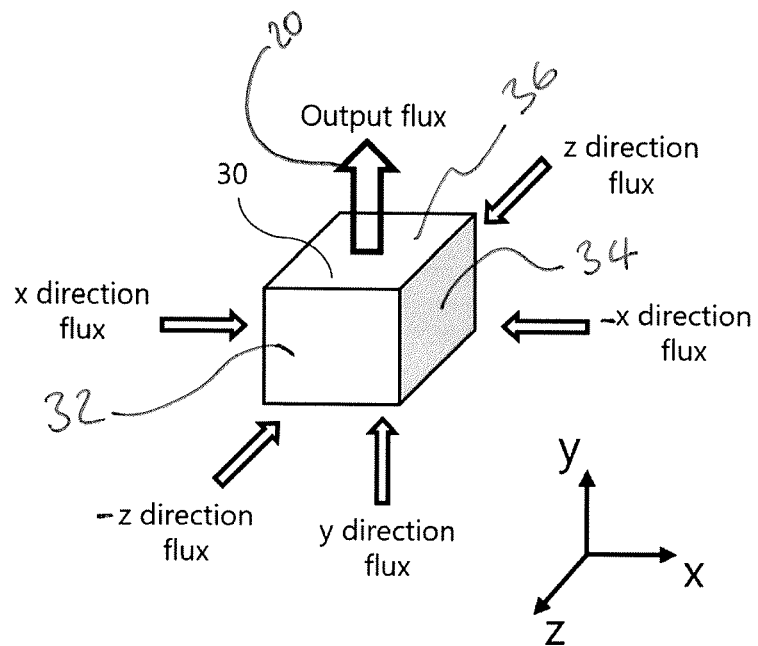
FIG. 1a illustrates focusing of magnetic flux through a magnetic pole piece (guiding element) using input flux from three directions.

FIG. 1a illustrates the concept of three-dimensional flux focusing as a method of providing magnetic flux in three different directions to a magnetic guiding element called pole piece 30, which combines the three-directional flux into a single stream and guides the flux towards the air gap G of an electrical machine. The magnetic pole piece in the preferred embodiment is formed of a ferromagnetic material. In another embodiment the pole piece can be formed of any soft magnetic material. Flux is provided in one or more of x and −x, y, and z and −z directions.

Opposing axial faces 32 of the pole piece 30 (z axis) are subject to flux in opposing directions. Opposing circumferential faces 34 of the pole piece 30 (x axis) are subject to flux in opposing directions. Of the radial faces 36 (y axis) a first face may be subject to flux and a second face provides output flux to the air gap G. At the faces flux is provided, the direction relative to the face at which it is provided will be the same. The sources of flux 40, 50, 60 in all the directions are in parallel from an equivalent magnetic circuit point of view such that the total flux is the sum of fluxes provided by each source. It is therefore possible to utilize several relatively weak sources of flux and still achieve high air gap flux density. Each source of magnetic flux 40, 50, 60 for the pole piece 30 must be oriented so that it contributes to the total output flux 20 for the pole piece 30. Each source of magnetic flux also actively suppresses leakage of flux in its respective direction. For instance, a source of magnetic flux providing flux in axial direction A acts against leakage of flux in axial direction A.

The three-dimensional flux shown in FIG. 1a is provided in direction of x, y and z axis with reference to a Cartesian coordinate system. If referring to a cylindrical or polar coordinate system the flux is provided in circumferential C, radial R, and axial A directions equivalent to x, y and z respectively, as shown in FIG. 1b.

Figure 1B:
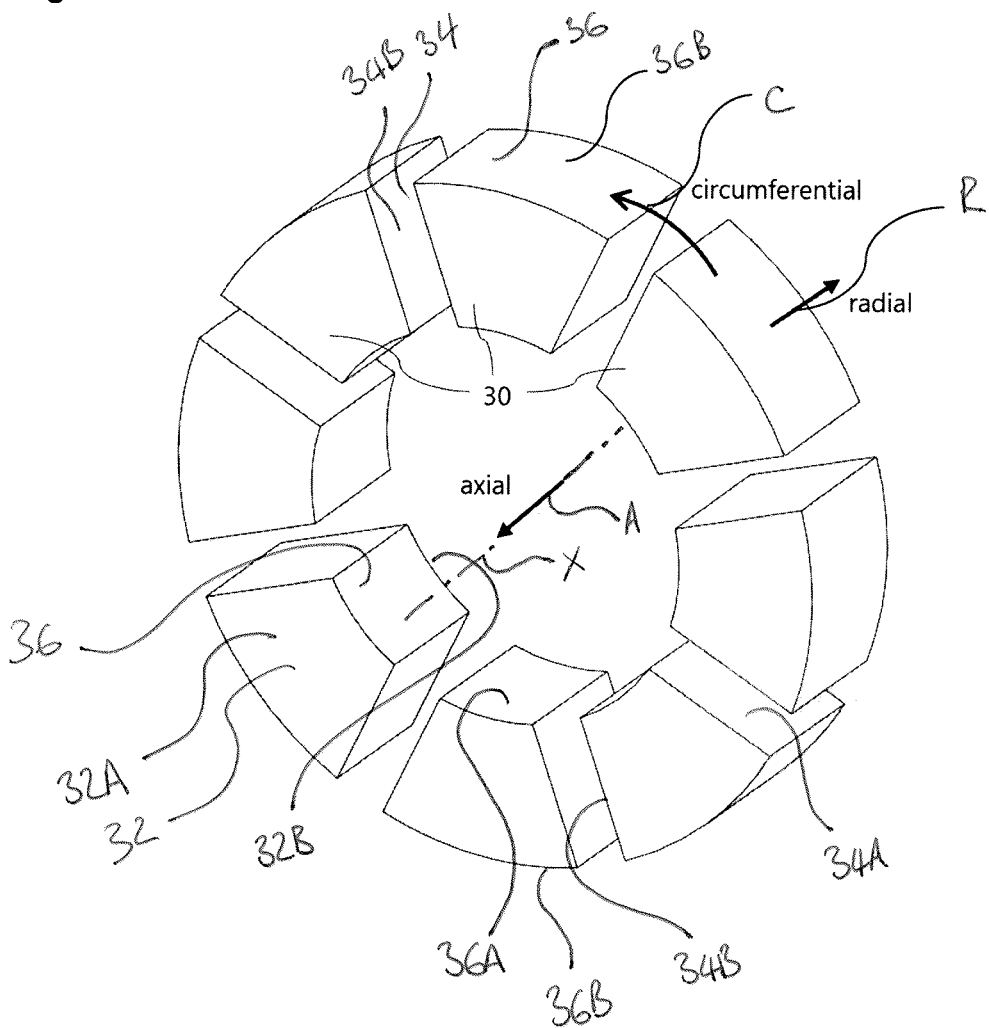
FIG. 1b shows the three directions (axial, radial and circumferential) for a circular array of magnetic pole pieces.

FIG. 1b shows a plurality of magnetic pole pieces 30 arranged in a circular pattern or array. The embodiment shown comprises 8 magnetic pole pieces, but it will be appreciated that one or more pole pieces are possible. Magnetic pole pieces 30 can have radially and circumferentially extending axial faces 32 comprising a first axial face 32A and a second axial face 32B. Magnetic pole pieces 30 can also have axially and radially extending circumferential faces 34 comprising a first circumferential face 34A and a second circumferential face 34B. Magnetic pole pieces 30 can also have axially and circumferentially extending radial surfaces 36 comprising a radially inner surface 36A and a radially outer surface 36B.

Figure 2A:
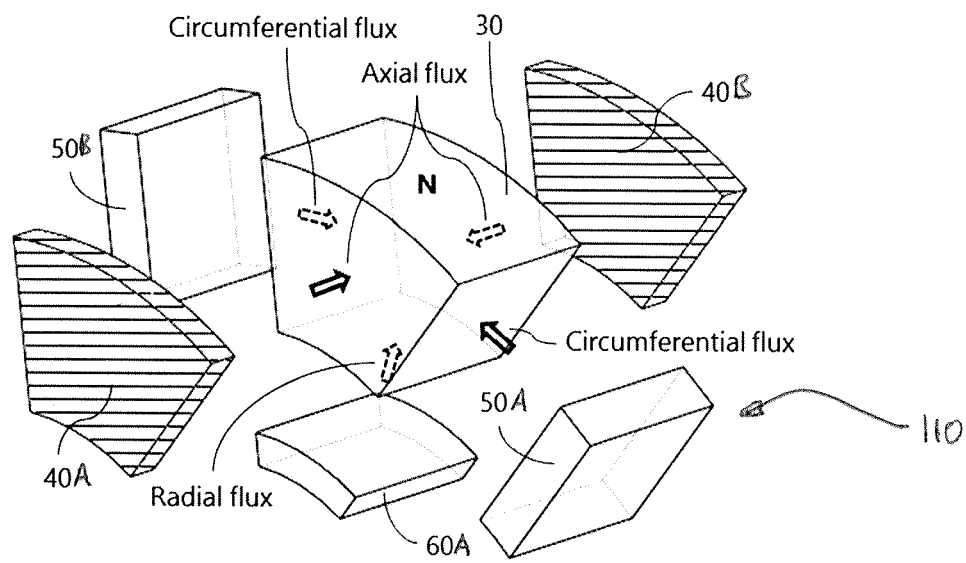
FIG. 2a presents components of one magnetic pole assembly having three-dimensional flux focusing using one magnetic pole piece and 5 block shaped permanent magnets. This arrangement can be used to construct a radial field internal rotor unit as shown in FIG. 2b FIG. 9a and FIG. 9b.
Figure 2B:
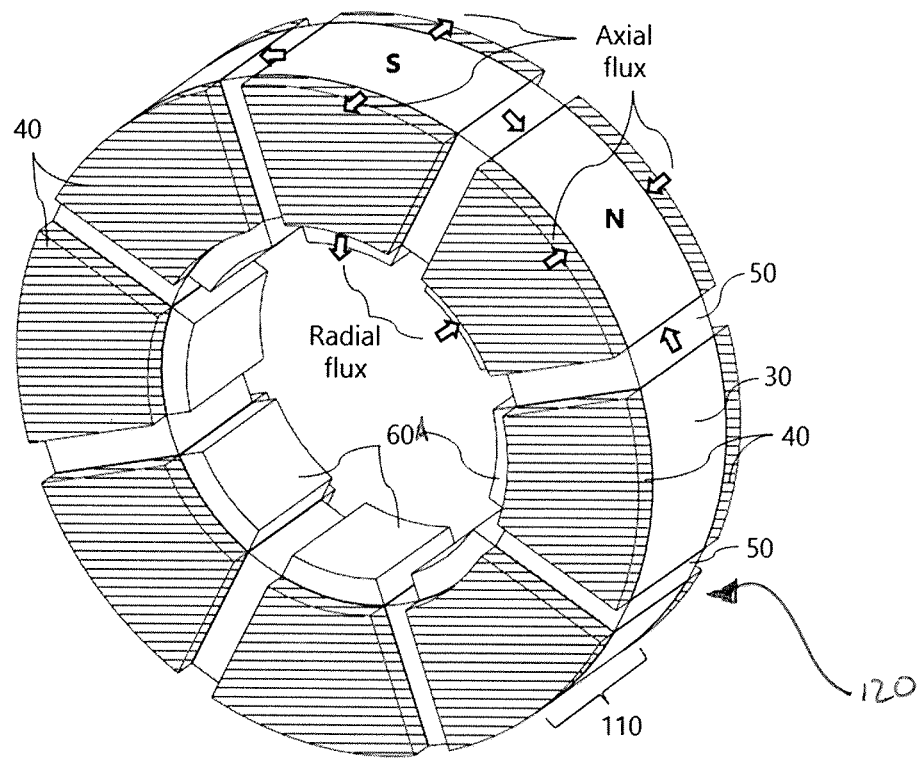
FIG. 2b shows a circular array of magnetic pole assemblies from FIG. 2a to construct a radial field internal rotor unit.

FIG. 2a shows components of a simple three dimensionally flux focused pole. It comprises a guiding element (magnetic pole piece 30) and 5 block shaped magnets 40, 50, 60 attached to 5 sides of the magnetic pole piece 30. There are two magnets providing flux in axial and circumferential directions (axially magnetised magnets 40 and circumferentially magnetised magnets 50) and one providing flux in radial direction (radially magnetised magnet 60). The sixth side of the pole piece 30 with no magnet attached is the side adjacent to the air gap. In an electrical machine, such configuration would represent a single pole and would be combined with other similarly looking elements into a circular array providing number of magnetic poles, as depicted in FIG. 2b. As shown in FIG. 2b, the polarity (N or S) of the magnetic pole depends on the direction of magnetisation of the magnets 40, 50, 60. For the purpose of clarity in this document, we term this circular array as 'rotor unit' 120.

The arrows in FIG. 2a and FIG. 2b represent the flux provided by the sources of magnetic flux 40, 50, 60 entering the magnetic pole piece. This has the effect of focusing the flux of the pole piece 30 towards the radial surface without a radial source of magnetic flux 60. In the embodiment of FIG. 2a it can be seen that the FIG. 2a and FIG. 2d show possible embodiments of sources of magnetic flux 40, 50, 60 arranged around a magnetic pole piece 30 to form a magnetic pole assembly 110 for providing focused flux to an airgap G.

The first one or more axial sources of magnetic flux 40 can comprise a first radially and circumferentially extending segment 40A and a second radially and circumferentially extending segment 40B. In one embodiment the one or more axial sources of magnetic flux 40 lie adjacent each of the axial faces 32 of the pole piece. In a further embodiment the first axial source of magnetic flux 40A and the second axial source of magnetic flux 40B lie adjacent to the first axial face 32A of the magnetic pole piece 30 and the second axial face 32B of the magnetic pole piece 30.

The second one or more circumferential sources of magnetic flux 50 can comprise a first axially and radially extending circumferential segment 50A and a second axially and radially extending circumferential segment 50B. In one embodiment the one or more circumferential sources of magnetic flux 50 lie adjacent each of the circumferential faces 34 of the pole piece. In a further embodiment the first circumferential source of magnetic flux 50A and the second circumferential source of magnetic flux 50B lie adjacent to the first circumferential face 34A of the magnetic pole piece 30 and the second circumferential face 34B of the magnetic pole piece 30.

The third radial source of magnetic flux 60 can comprise a circumferentially and axially extending first radial segment 60A or a circumferentially and axially extending second radial segment 60B. In one embodiment the radial source of magnetic flux 60 lies adjacent to one of the radial faces 36 of the pole piece. In a further embodiment the first radial source of magnetic flux 60A or the second radial source of magnetic flux 60B lie adjacent to the first inner radial face 36A of the magnetic pole piece 30 or the second outer radial face 36B of the magnetic pole piece 30. Thereby allowing flux to flow from the one or more sources of magnetic flux 40, 50, 60 into the one or more magnetic pole pieces 30.

For the purpose of this application flux has been show in multiple figures by way of outlined arrows. It will be understood that said arrows represent a flow of flux within a magnet from a south pole to a north pole with the arrow head representing the north direction.

FIG. 2a and FIG. 2b show the magnetic flux provided by the pole pieces 30 and the sources of magnetic flux 40, 50, 60. The pole pieces 30 having a north side N and a south side S radially displaced from one another. The first one or more axial sources of magnetic flux 40 comprise axially magnetised magnets having a north side N and a south side S displaced axially along Axis X from each other. The second one or more circumferential sources of magnetic flux 50 comprise circumferentially magnetised magnets having a north side N and a south side S displaced circumferentially around axis X from each other. The third one or more radial sources of magnetic flux 60 comprise radially magnetised magnets having a north side N and a south side S displaced radially from each other. Said sources of magnetic flux 40, 50, 60 lying with same side adjacent to the pole piece 30 as the pole piece presents to the air gap i.e. if the pole piece presents its north side N to the air gap the sources of magnetic flux will lie with their north sides adjacent to the pole piece.

The one or more sources of magnetic flux 40, 50, 60 together with the pole piece 30 create a single magnetic pole assembly 110. A plurality of magnetic pole assemblies 110 arranged in a circular pattern or array around an axis of rotation X creates a radial field rotor unit. In the preferred embodiment the plurality of magnetic pole assemblies 110 comprising a plurality of pole pieces 30, the consecutive pole pieces having alternating magnetic polarity as displayed in FIG. 2b. Pole pieces 30 are typically employed in electrical machines in this fashion to provide electromagnetic excitation.

Figure 9A:
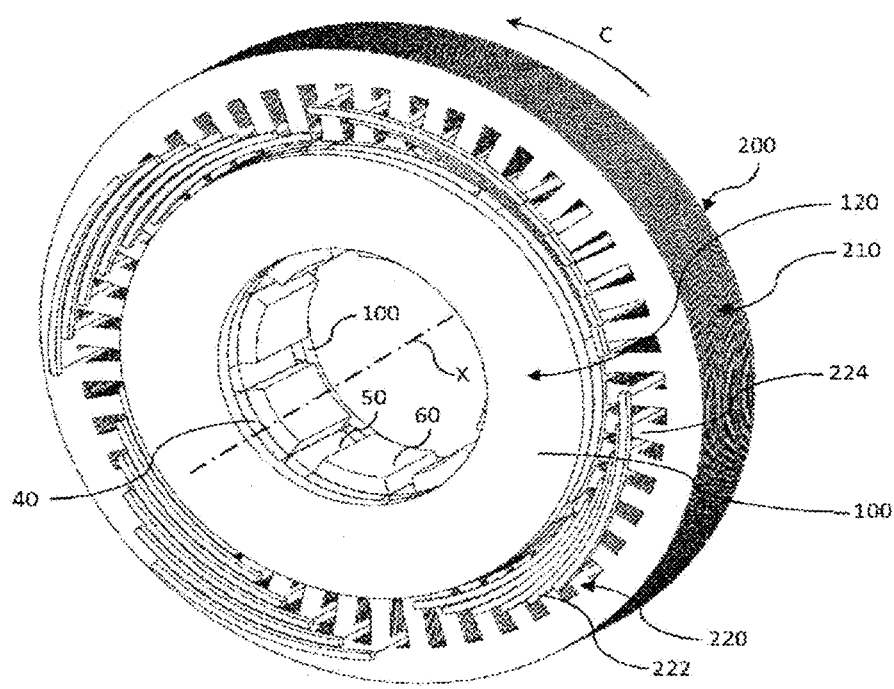
FIG. 9a shows a circular array of magnetic pole assemblies forming a radial field internal rotor unit including ferromagnetic end plates and a stator assembly comprising a laminated stator and a plurality of electromagnets, together forming an electric motor.
Figure 9B:
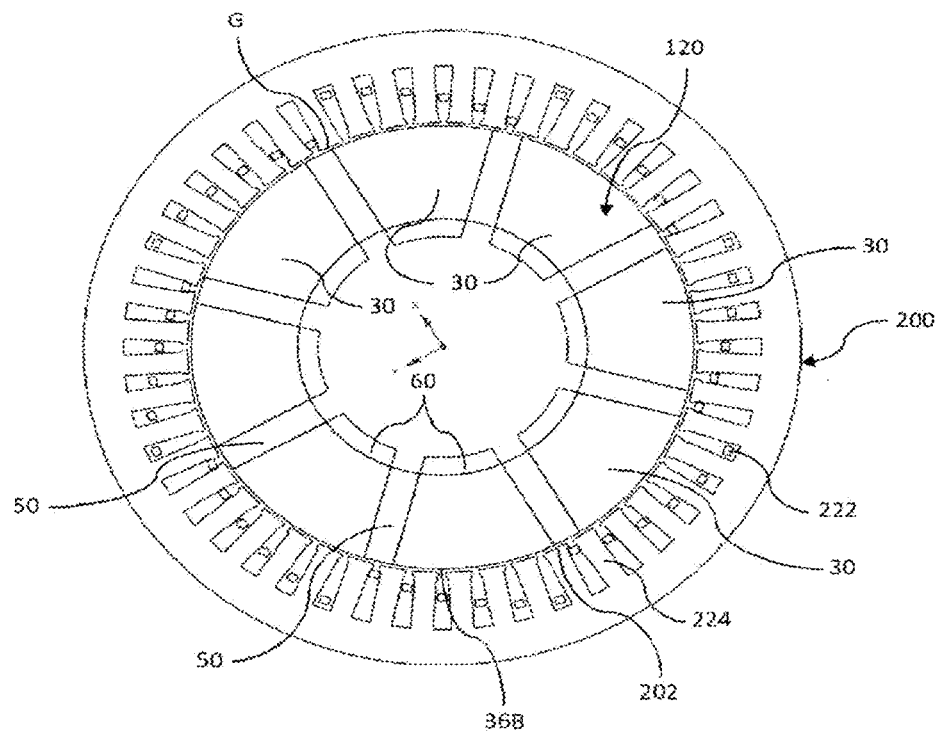

FIG. 2a shows a magnetic pole assembly 110 suitable for use in the radial field internal rotor unit shown in FIG. 2b. In this embodiment one or more sources of magnetic flux lie adjacent to the radially inner surface 36A but not the radially outer surface 36B. The radially outer surface 36B being adjacent to the air gap G when used in an electric motor as shown in FIGS. 9a and 9b.

Figure 2C:
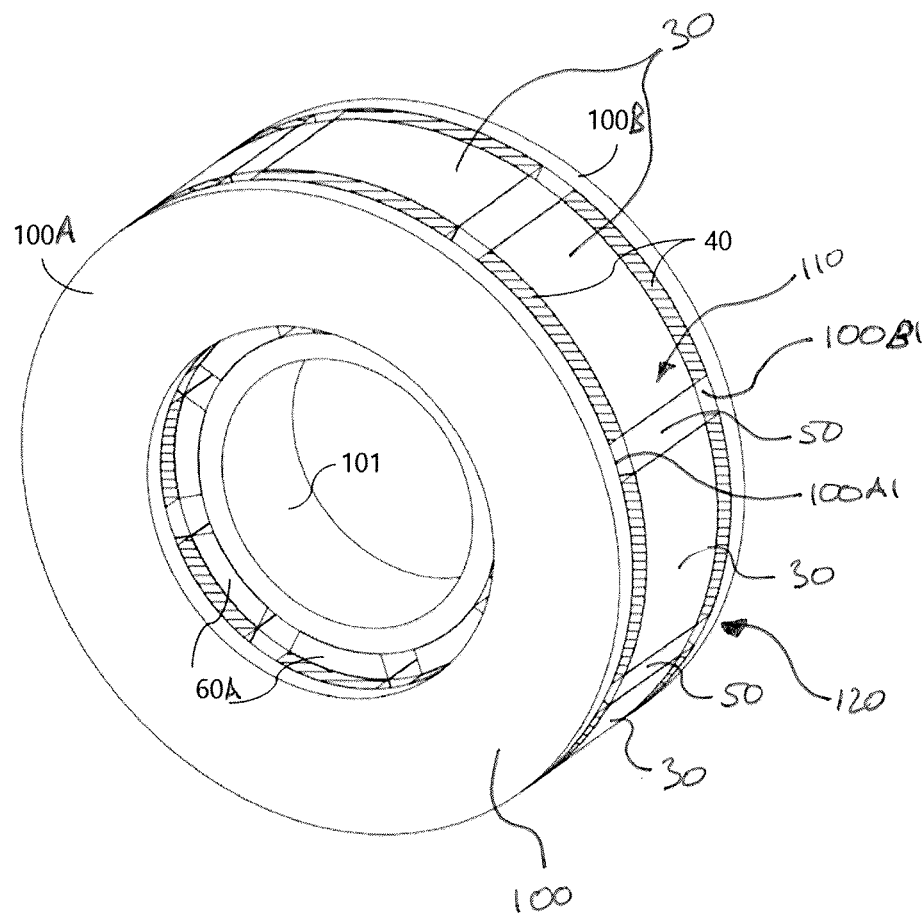
FIG. 2c shows the radial field internal rotor unit of FIG. 2b including ferromagnetic end plates and a magnetic axially extending tubular structure.
Figure 2D:
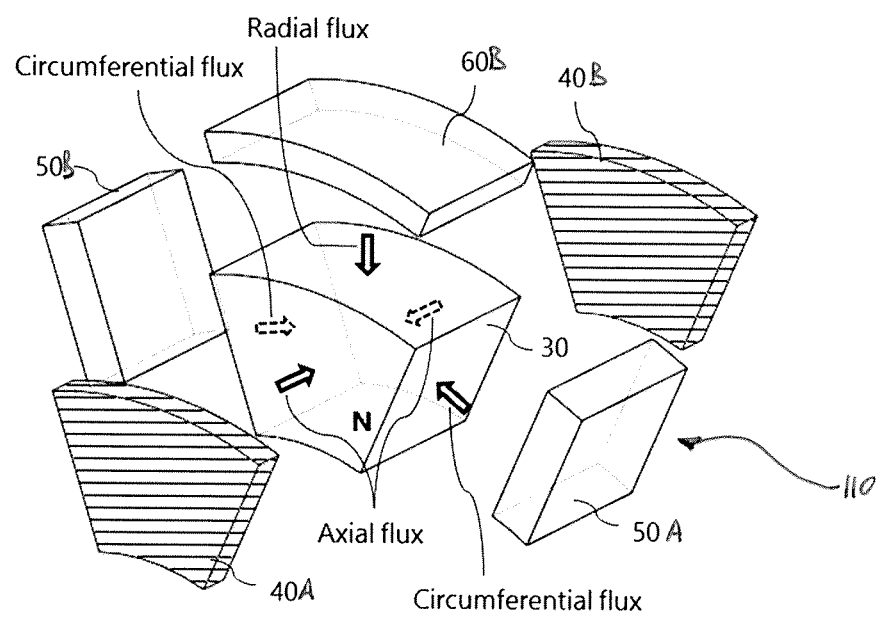
FIG. 2d presents components of one magnetic pole assembly having three-dimensional flux focusing using one magnetic pole piece and 5 block shaped magnets. This arrangement can be used to construct a radial field external rotor unit as shown in FIGS. 2e, 10a and 10b.
Figure 2E:
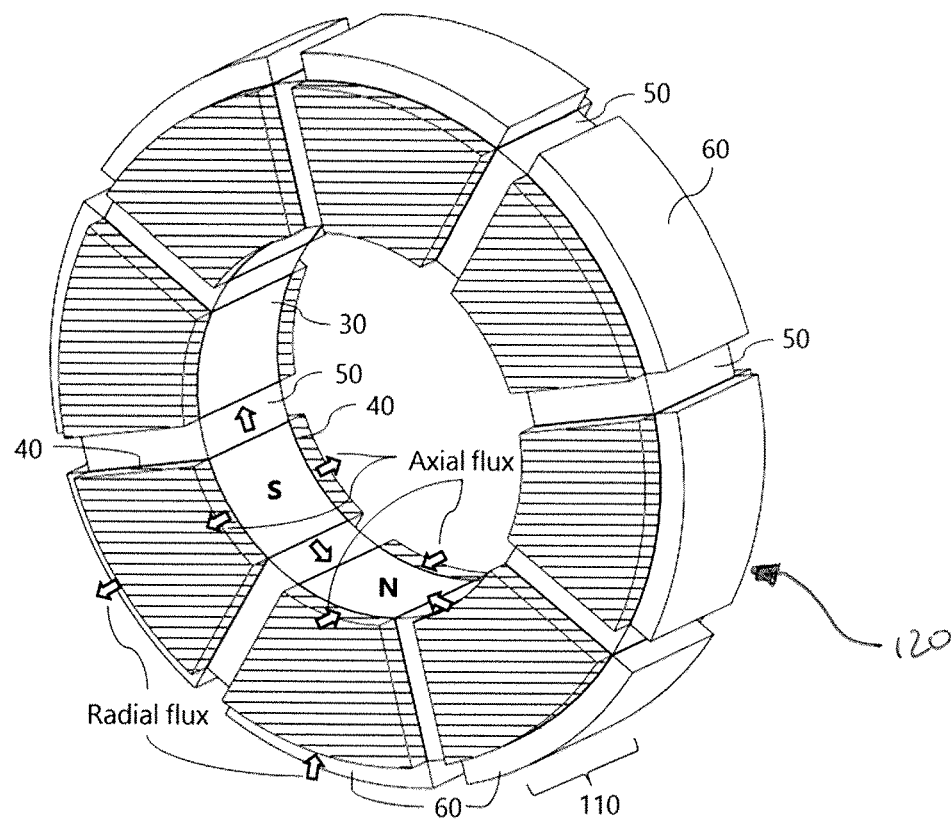
FIG. 2e shows a circular array of magnetic pole assemblies from FIG. 2d to construct a radial field external rotor unit.
Figure 10A:
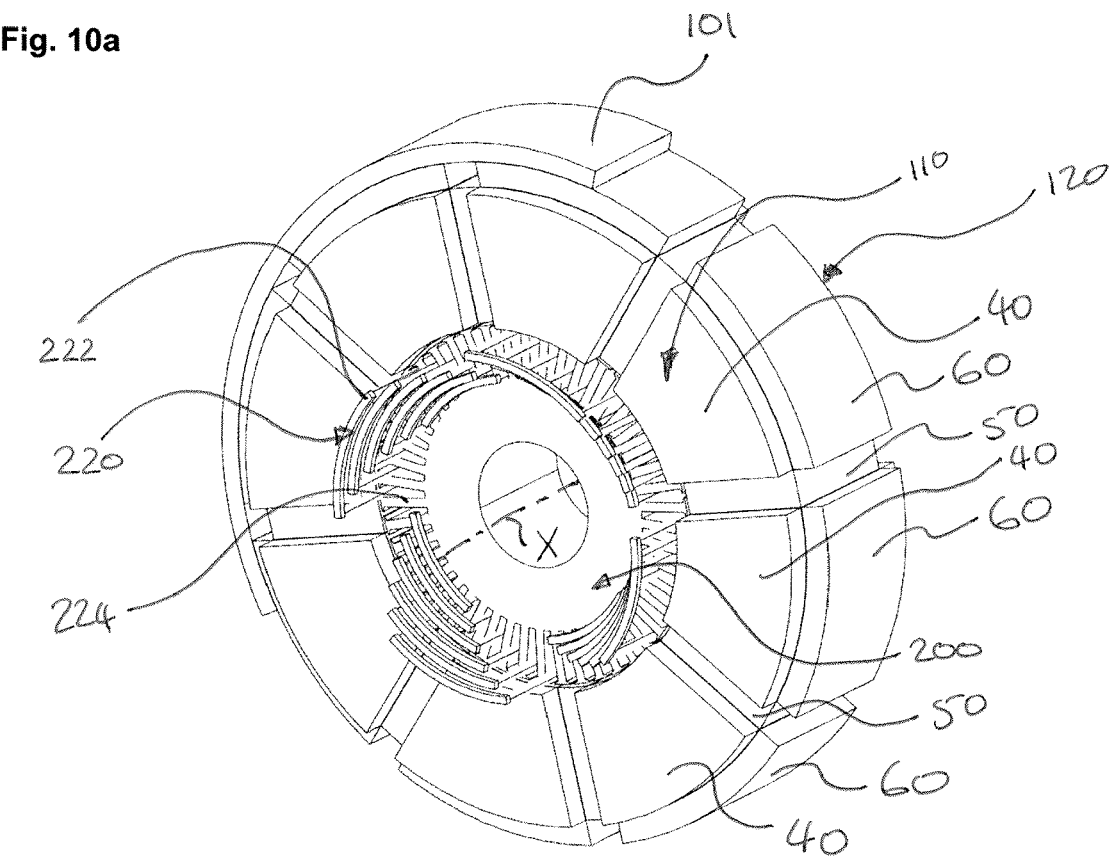
FIG. 10a shows a circular array of magnetic pole assemblies forming a radial field external rotor unit including a section view of the axially extending tubular structure and a stator assembly comprising a stator and a plurality of electromagnets, together forming an electric motor.
Figure 10B:
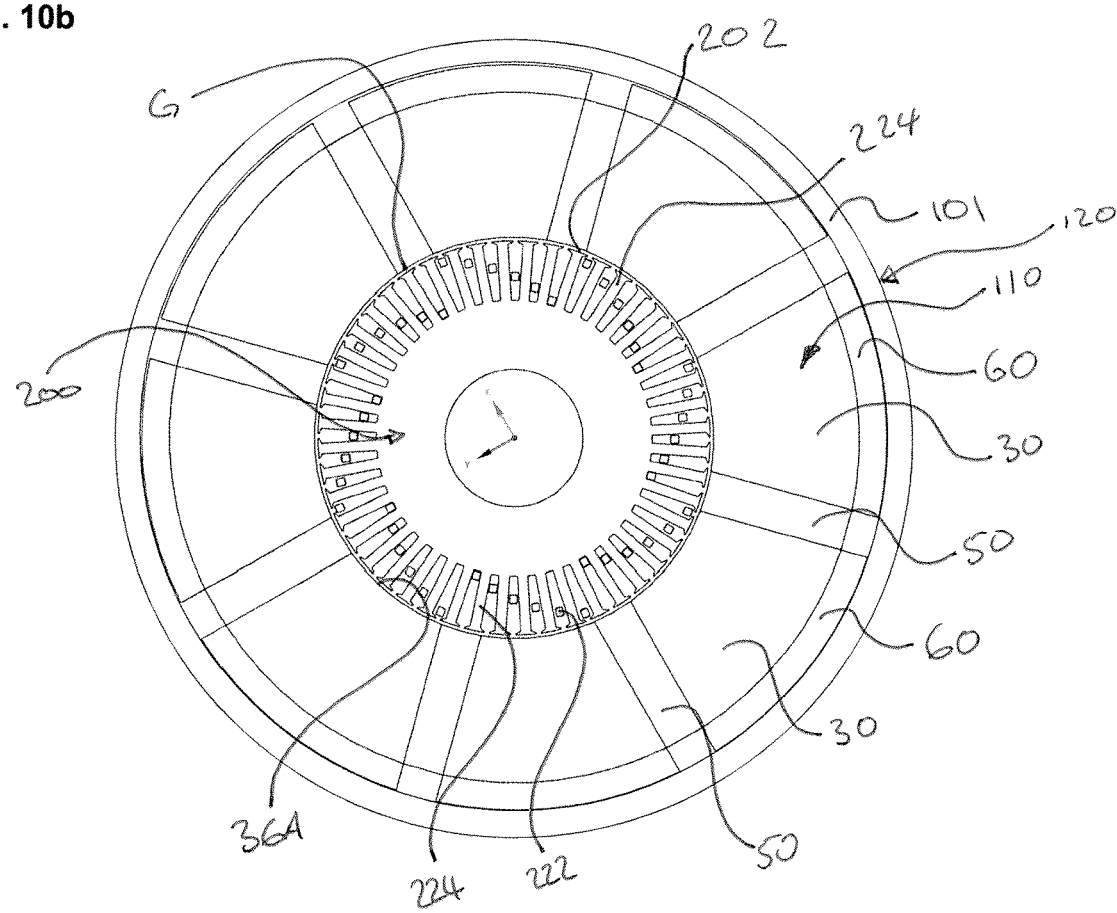

FIG. 2d shows a magnetic pole assembly 110 suitable for use in the radial field external rotor unit shown in FIG. 2e. In this embodiment one or more sources of magnetic flux lie adjacent to the radially outer surface 36B but not the radially inner surface 36A. The radially inner surface 36A being adjacent to the air gap G when used in an electric motor as shown in FIGS. 10a and 10b.

The sources of magnetic flux are arranged to focus the magnetic flux of the pole piece 30 towards and out of the radial surface 36 not having a source of magnetic flux adjacent there to into the air gap G.

Figure 2F:
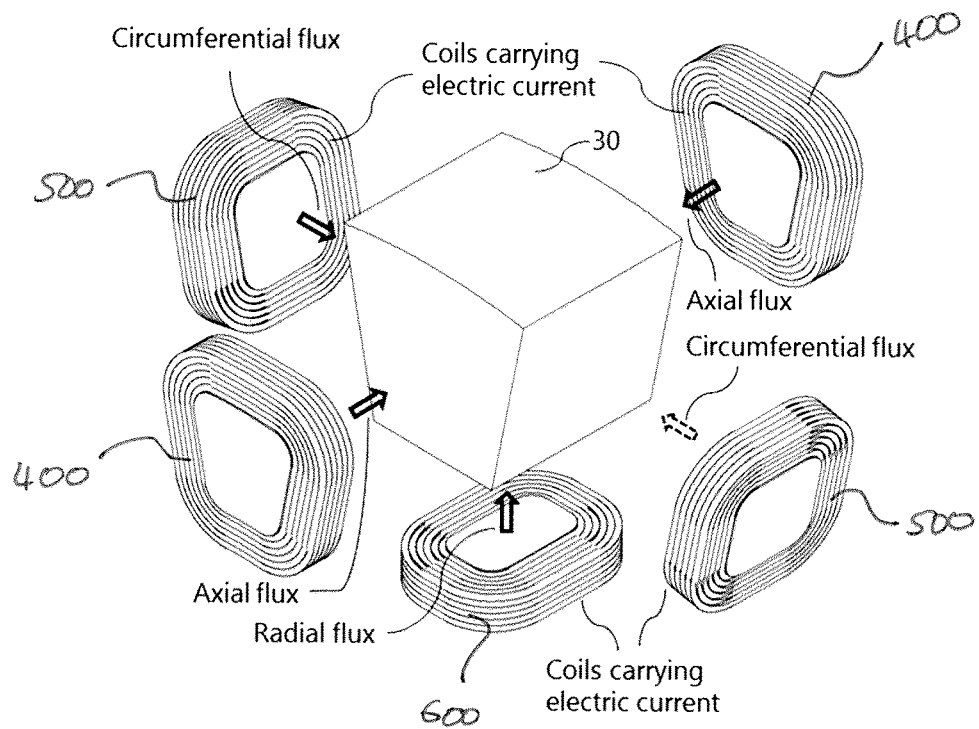
FIG. 2f presents components of one magnetic pole assembly having three-dimensional flux focusing, using one magnetic pole piece and 5 sources of magnetic flux wherein the sources of magnetic flux are constructed using coils carrying electric current.
Figure 2G:
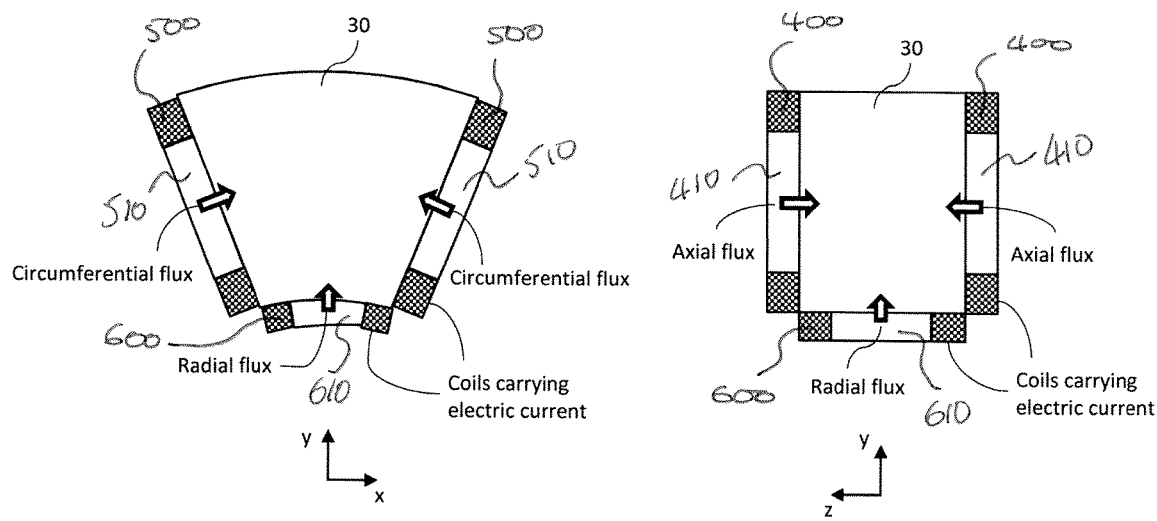
FIG. 2g presents axial and radial cross section views of the magnetic pole assembly of FIG. 2f.
Figure 2H:
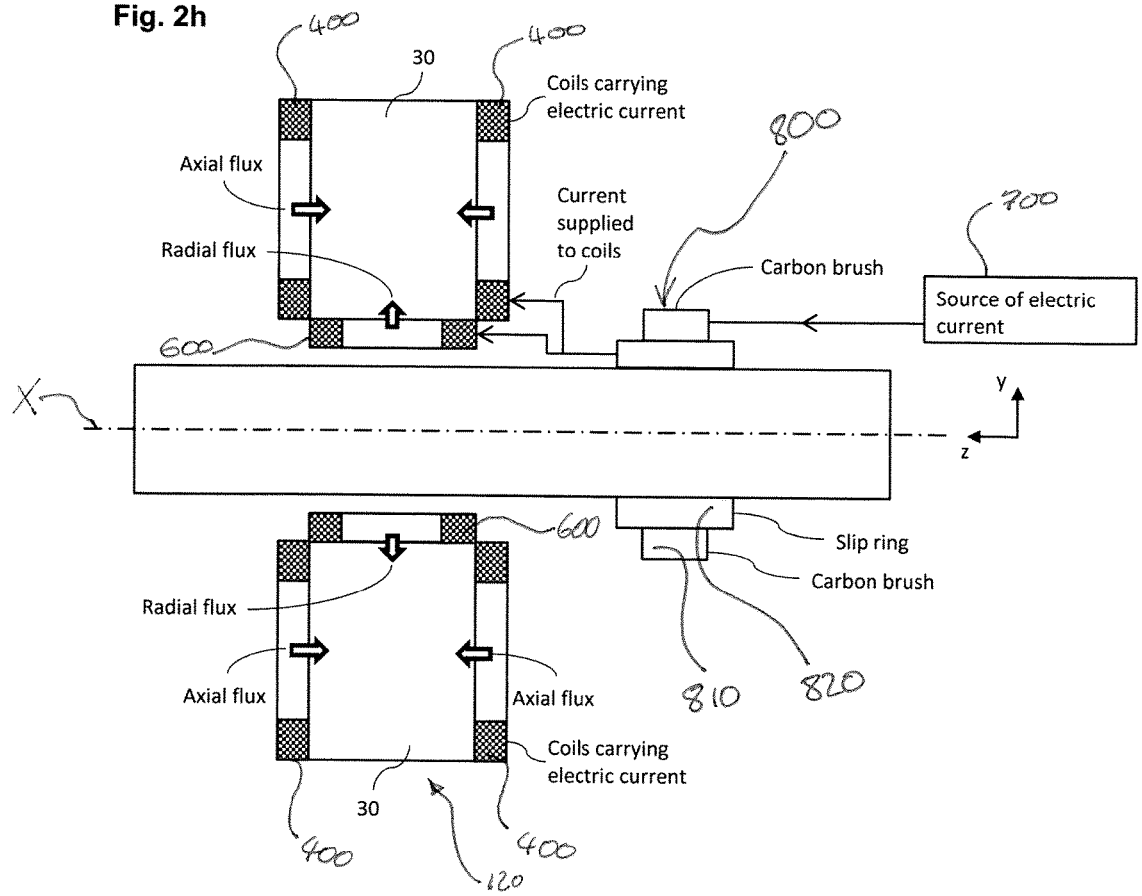
FIG. 2h presents a cross section view of a rotor of an electric motor using a plurality of the magnetic pole pieces of FIG. 2f and FIG. 2g and the electrical supply to the coils of the sources of magnetic flux of FIG. 2f and FIG. 2g.

The one or more sources of magnetic flux 40, 50, 60 utilized in the 3D flux focused magnetic pole assemblies of the preferred embodiment are permanent magnets as shown in FIG. 2a-e. In a further embodiment shown in FIG. 2f-h the one or more sources of magnetic flux 40, 50, 60 are electro-magnets comprising coils 400, 500, 600 carrying electric current. In another embodiment the source of magnetic flux 40, 50, 60 is a combination of coils 400, 500, 600 carrying electric current and permanent magnets or any other source of magnetic flux may be used. The coils 400, 500, 600 may be wrapped around a core of magnetic material 410, 510, 610. The coils 400, 500, 600 may be supplied by electric current from a source of electric current 700. Said electrical current passing from the stationary source of electric current 700 to the coils 400, 500, 600 on the rotating magnetic pole assembly 110 by way of a carbon brush 810 and slip ring 820 assembly 800.

Although, a radial field internal rotor unit 120 is shown in this embodiment (FIG. 2*b* and FIG. 2*c*), same concept of three-dimensional flux focusing can be used to construct a radial field external rotor unit 120 as shown in FIG. 2*e*. In FIG. 2*d*, one pole for the radial field external rotor unit is depicted where the face at the inner radius of the pole piece 30 is adjacent to the air gap and the radially magnetised magnet 60 is placed on the face located at outer radius of the pole piece 30. A circular array of such poles with alternating magnetic polarity creates the rotor unit 120 shown in FIG. 2*e*.

In addition to the sources of magnetic flux 40, 50, 60 and the flux guiding element or magnetic pole piece 30, further magnetic components can be provided for the purpose of further improving effectiveness of three-dimensional flux focusing. For instance, ferromagnetic plates 100 (shown in FIGS. 2*c* and 9*a*) can provide return path for flux generated by the axial sources of magnetic flux or magnetised magnets 40 and effectively reduce reluctance of flux path for any of the flux sources. In one embodiment said ferromagnetic plates 100 extend radially and circumferentially. The ferromagnetic plates 100 can comprise a first ferromagnetic plate 100A and a second ferromagnetic plate 100B. Said first and second ferromagnetic plates 100A, 100B can each have a first face 100A1, 100B1. The first face 100A1, 100B1 of the respective first and second plates 100A, 100B adjacent respective first and second segments 40A, 40B. Further additional components such as a ferromagnetic axially extending tubular structure 101 may be included to provided return path for flux and to reduce reluctance of the flux path. For instance, in the embodiment shown in FIG. 2*c*, FIG. 10*a* and FIG. 10*b*, ferromagnetic axially extending tubular structure 101 lies adjacent to radial sources of flux 60. The plates 100 and the tube 101 must be dimensioned so that the flux passing through them will not cause excessive saturation.

While most embodiments described in this document are of radial field internal rotors (i.e. radial field rotor where air gap is adjacent to the outer diameter), identical concept can be used for radial field external rotor.

In addition, a single component or structure can provide multiple sources of magnetic flux 40, 50, 60 in one or more directions.

Figure 3A:
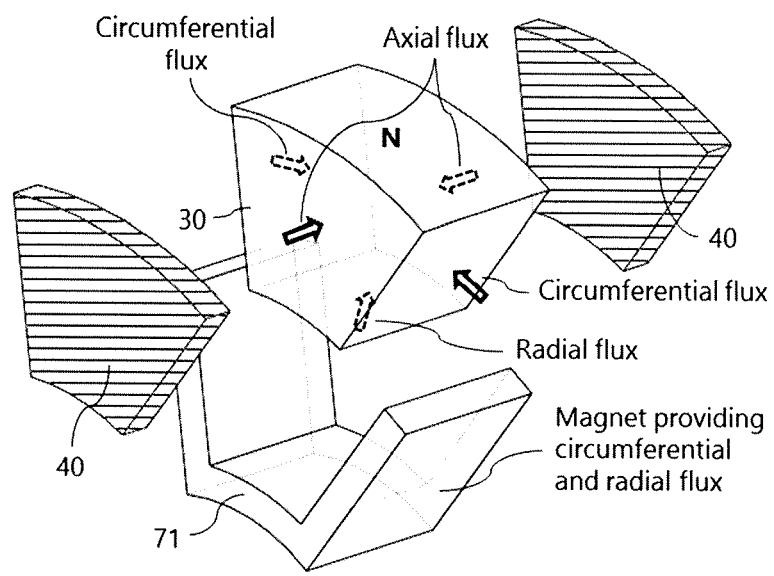
FIG. 3a presents components of one magnetic pole assembly having three-dimensional flux focusing using a unitary magnetic flux source that provides radial and circumferential flux, and a set of sources of magnetic flux providing axial flux.
Figure 3B:
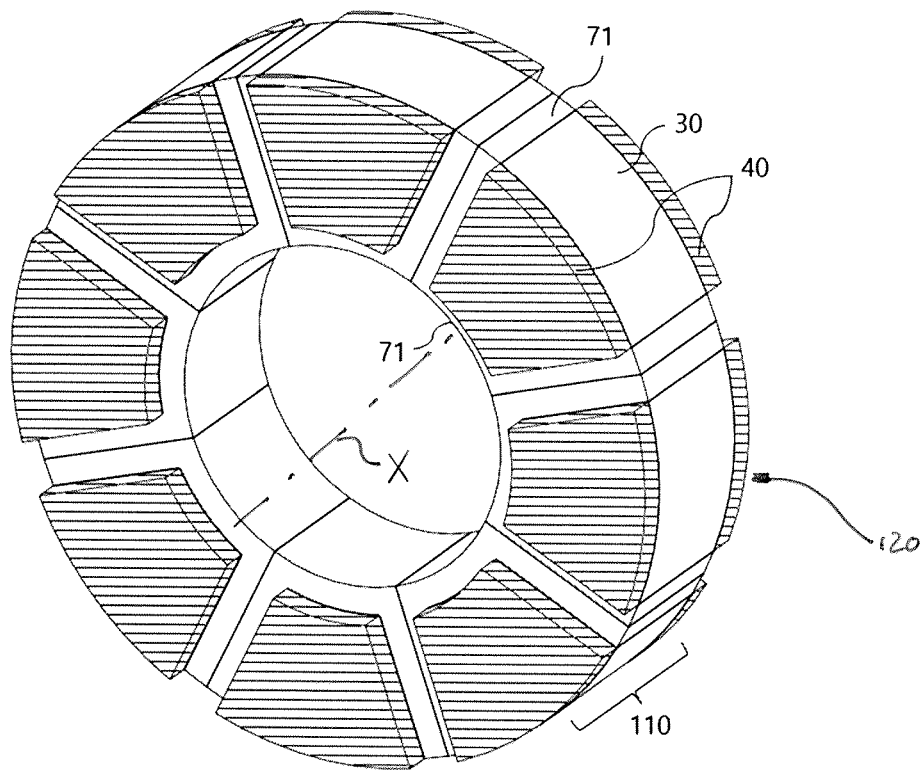
FIG. 3b shows a circular array of magnetic pole assemblies from FIG. 3a to construct a radial field internal rotor unit.

The further embodiment shown in FIG. 3*a* presents alternative arrangement to that with 5 sources of magnetic flux. A single piece, unitary structure 71, provides a second circumferential source of flux 50 and a third radial source of flux 60 and replaces three out of 5 individual sources of magnetic flux, thus reducing the number of components providing a source of magnetic flux to 3 in order to create a magnetic pole. Here, the single piece, unitary structure 71 provides flux in two of the three directions. Separate axial sources of magnetic flux 40 provide flux in axial direction for each pole, thus realizing the three-dimensional flux focusing for the pole piece 30. This arrangement can be put together in a circular array to construct a radial field internal rotor unit 120 as depicted in FIG. 3*b*.

Figure 4A:
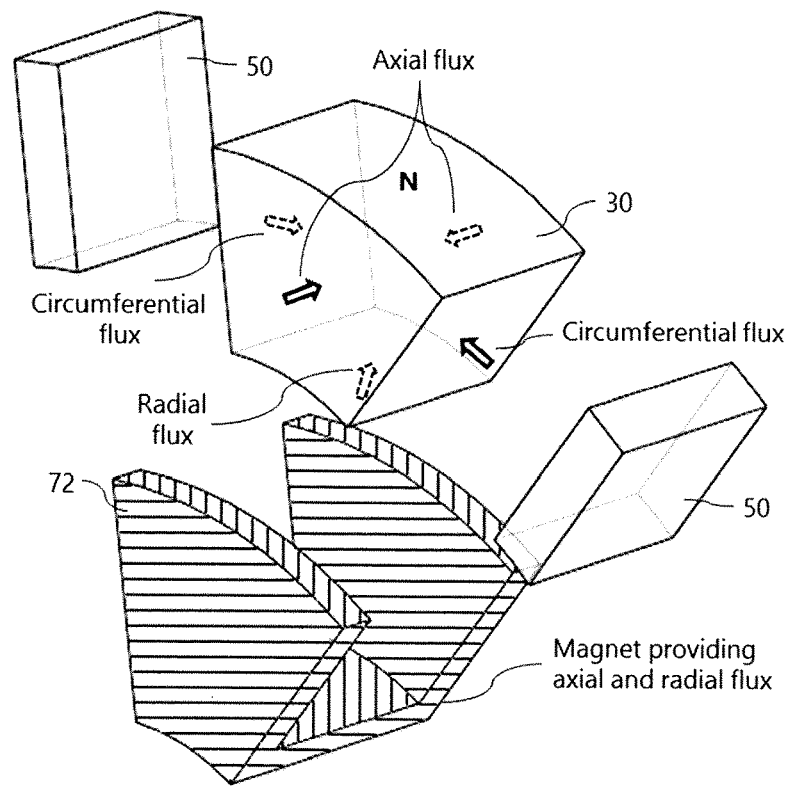
FIG. 4a presents components of one magnetic pole assembly having three-dimensional flux focusing using a unitary magnetic flux source that provides radial and axial flux, and a set of sources of circumferential sources of magnetic flux providing circumferential flux.
Figure 4B:
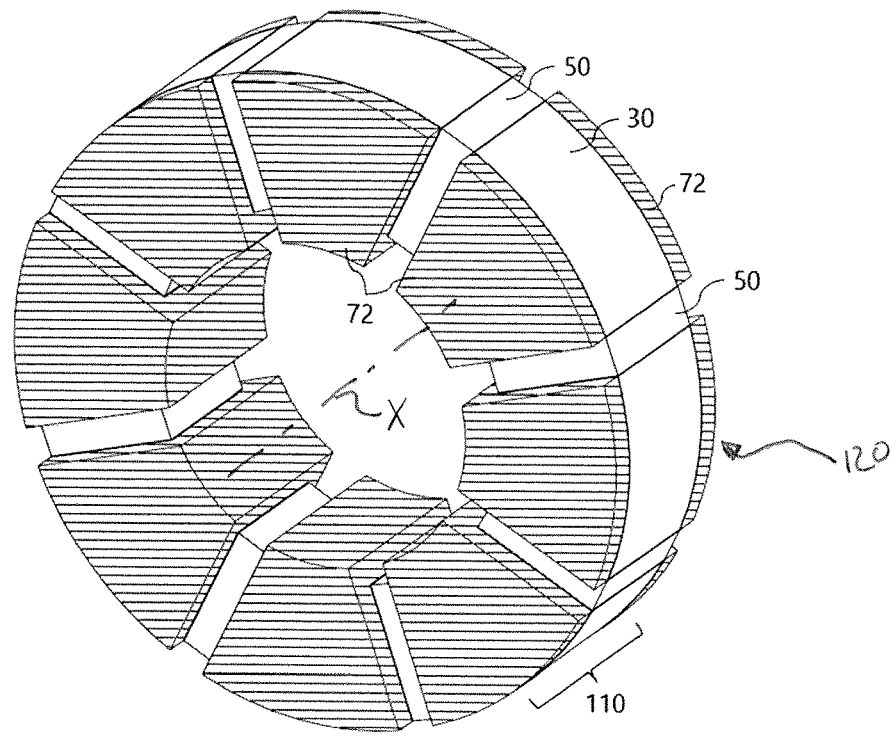
FIG. 4b shows a circular array of magnetic pole assemblies from FIG. 4a to construct a radial field internal rotor unit.

Similarly, FIG. 4*a* presents another further embodiment of a magnetic pole assembly 110 when a single piece, unitary structure 72 is used to provide a first axial source of flux 40 and a third radial source of flux 60. The source of flux in the circumferential direction is provided by separate sources of circumferential magnetic flux 50. A circular array of this arrangement is shown in FIG. 4*b*.

Figure 5A:
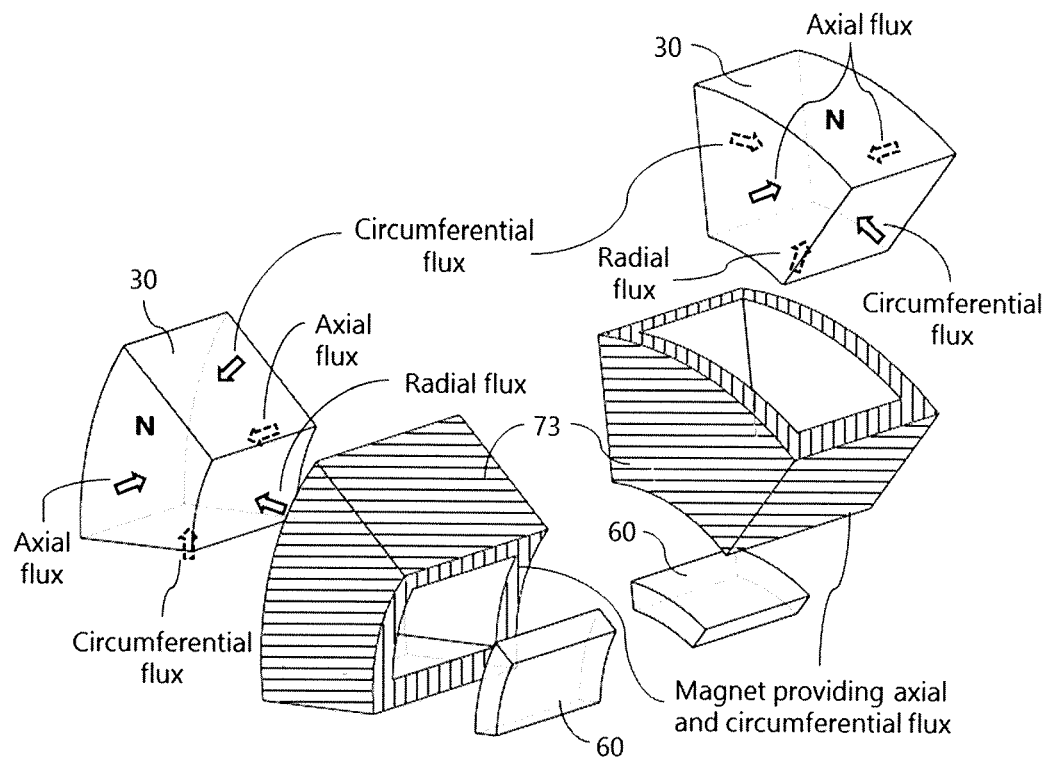
FIG. 5a presents components of one magnetic pole assembly having three-dimensional flux focusing using a unitary magnetic flux source that provides axial and circumferential flux.
Figure 5B:
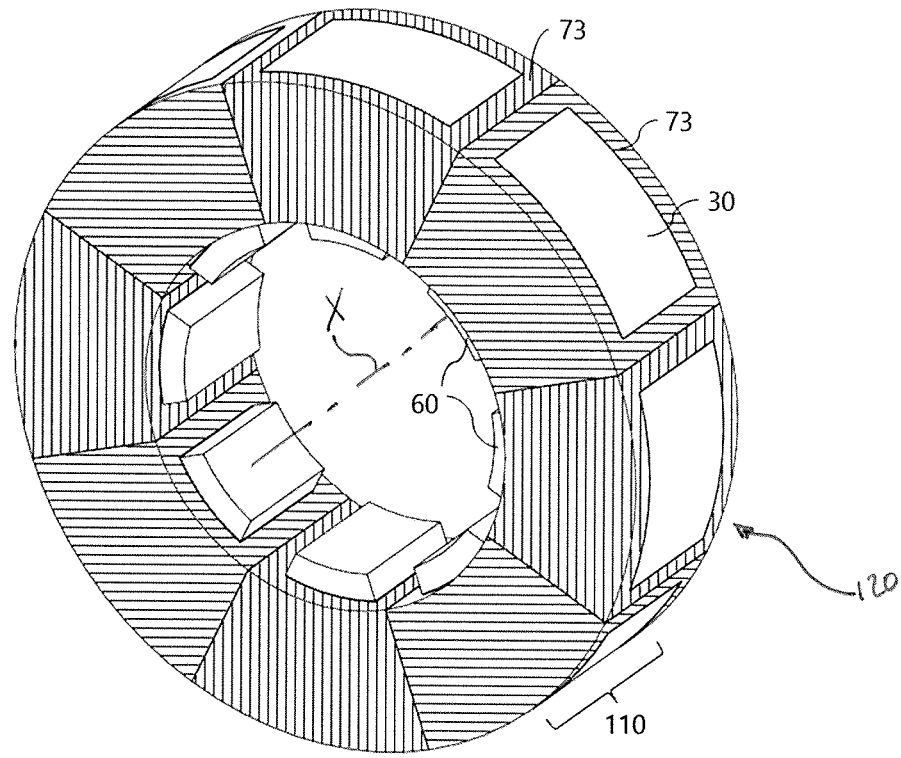
FIG. 5b shows a circular array of magnetic pole assemblies from FIG. 5a to construct a radial field internal rotor unit.

Another alternative embodiment of a magnetic pole assembly 110 is shown in FIG. 5*a* where a single piece, unitary structure 73 provides a first axial source of magnetic flux 40 and a second circumferential source of magnetic flux. A separate radial source of magnetic flux 60 provides flux in radial direction for each pole. A circular array of this arrangement is shown in FIG. 5*b*.

Figure 7:
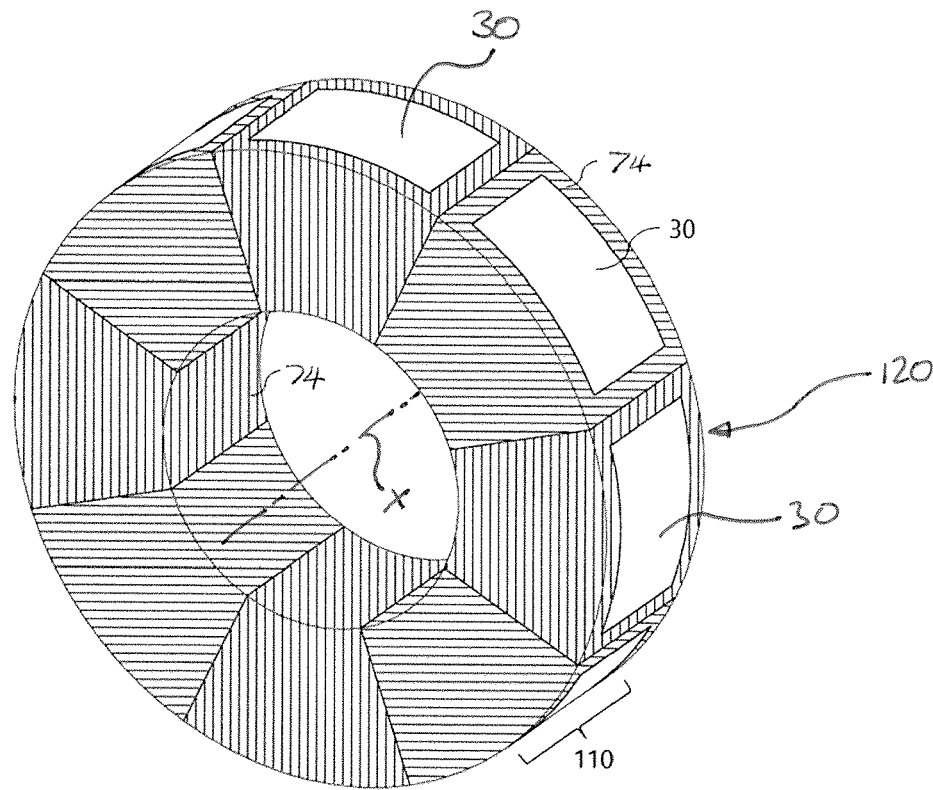
FIG. 7 shows a radial field internal rotor unit where each magnetic pole assembly is constructed using a magnetic pole piece and single cup shaped unitary magnetic flux source providing flux in all the three directions.

The further embodiment shown in FIG. 7 presents an alternative arrangement where the topology and direction of magnetisation of magnets in the magnetic pole assembly 110 is such that a single unitary structure 74 provides a source of magnetic flux 40, 50, 60 in all the three directions: axial, radial and circumferential. The shown topology encloses the magnetic pole pieces 30 across the faces at the inner radius and rotor unit's 110 circumferential and axial directions.

Figure 6A:
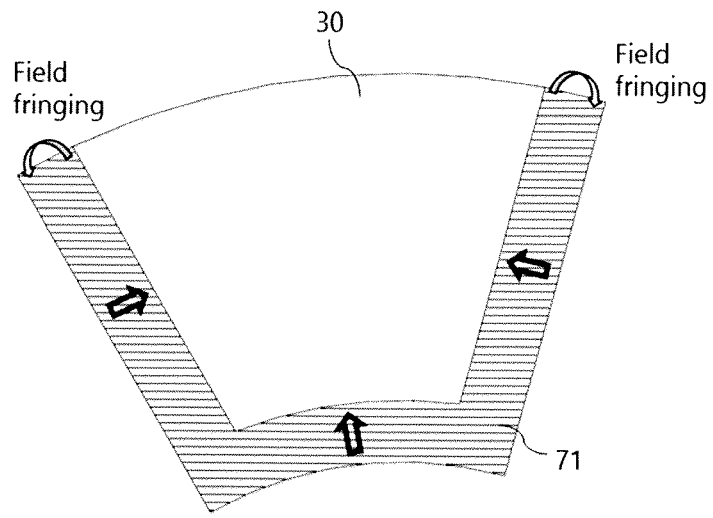
FIG. 6a shows a section view of a magnetic pole assembly having a unitary magnetic flux source providing flux to the magnetic pole piece. Field fringing occurs at two edges.
Figure 6B:
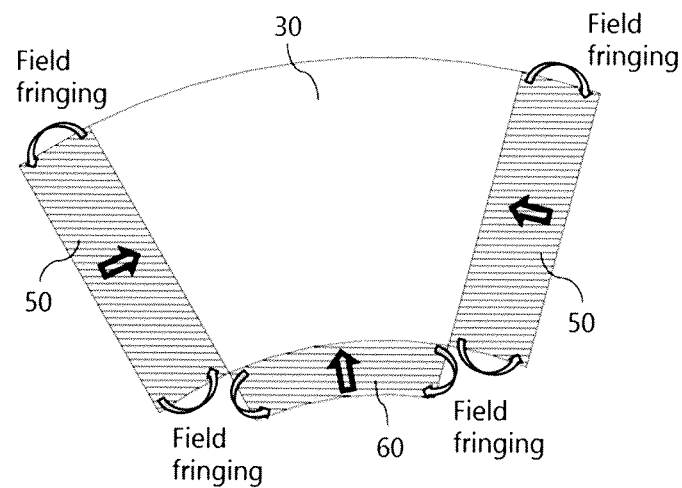
FIG. 6b shows a section view of a magnetic pole assembly having three sources of magnetic flux to the magnetic pole piece. Field fringing occurs at two edges of each magnet.

The advantage of the concepts with the embodiments shown in FIG. 3, FIG. 4 FIG. 5 and FIG. 7 is that it tends to reduce loss of useful magnetic flux due to field fringing near the magnet edges. This phenomenon is shown in FIG. 6. Single piece magnet providing flux in two directions has only two edges where field fringing occurs (FIG. 6*a*), unlike similar arrangement with 3 separate magnet blocks which has 6 edges where field fringing occurs (FIG. 6*b*). Field fringing results in increased reluctance and a loss of flux density and a reduction in the flux focusing effect.

Although, a radial field internal rotor unit 120 is shown in these embodiments (FIG. 3*b*, FIG. 4*b* FIG. 5*b* and FIG. 7), the same concept of three-dimensional flux focusing can be used to construct a radial field external rotor unit 120 similar to that illustrated in FIG. 2*e* by changing the shape or placement of magnets such that the focused radial flux is provided on a face at external radius of the pole piece 30.

Although, a radial field internal rotor unit 120 is shown in the embodiments of FIG. 2, FIG. 3, FIG. 4 FIG. 5 and FIG. 7, the same concept of three-dimensional flux focusing can be used to construct a radial field external rotor unit 120 similar to that illustrated in FIG. 2*e* by changing the shape or placement of magnets such that the radial flux is provided on a face at external radius of the pole piece 30.

It is beneficial if a magnetic return path is provided for flux generated by radially magnetised magnets 60. This return path can be provided by axially extending tubular structure 101, hub or shaft made of magnetic material.

The rotor unit 120 in some embodiments can have an array of radially magnetised magnets 60 (as shown in FIGS. 5 & 6) placed at the inner radius of the magnetic pole pieces 30. This would further improve the flux density in the air gap between rotor and stator.

Although, a radial field internal rotor is shown in these embodiments, the same concept of three-dimensional flux focusing can be used to construct a radial field external rotor using rotor unit 120 similar to that illustrated in FIG. 2*e* by changing the placement of radially magnetised magnets such that the radial flux is provided on a face at external radius of the pole piece 30.

Figure 8A:
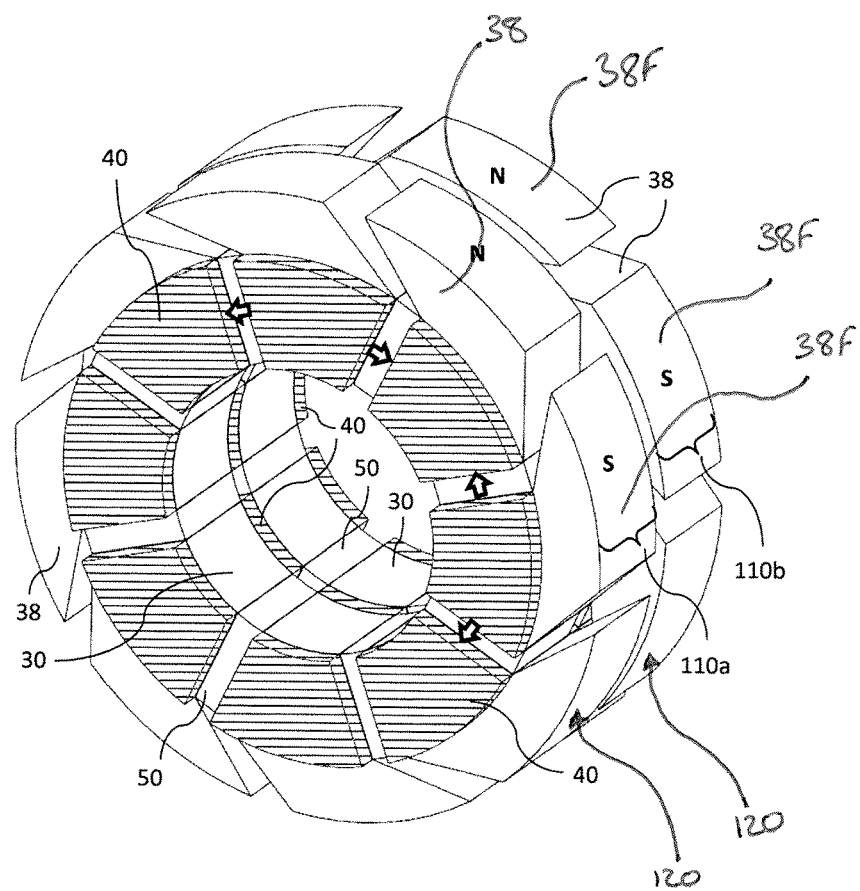
FIG. 8a shows a circular array of magnetic pole assemblies arranged to form a radial field internal rotor unit with two rotor units. For each of the rotor units, magnetic pole pieces, axially magnetised magnets and circumferentially magnetised magnets are shown. The rotor unit comprising multiple magnetic pole assemblies wherein each magnetic pole piece includes a pole shoe extending from the radial surface. The plie shoe offsets radial surface radially and circumferentially and the direction of this circumferential offset is different for the neighbouring rotor units.
Figure 8B:
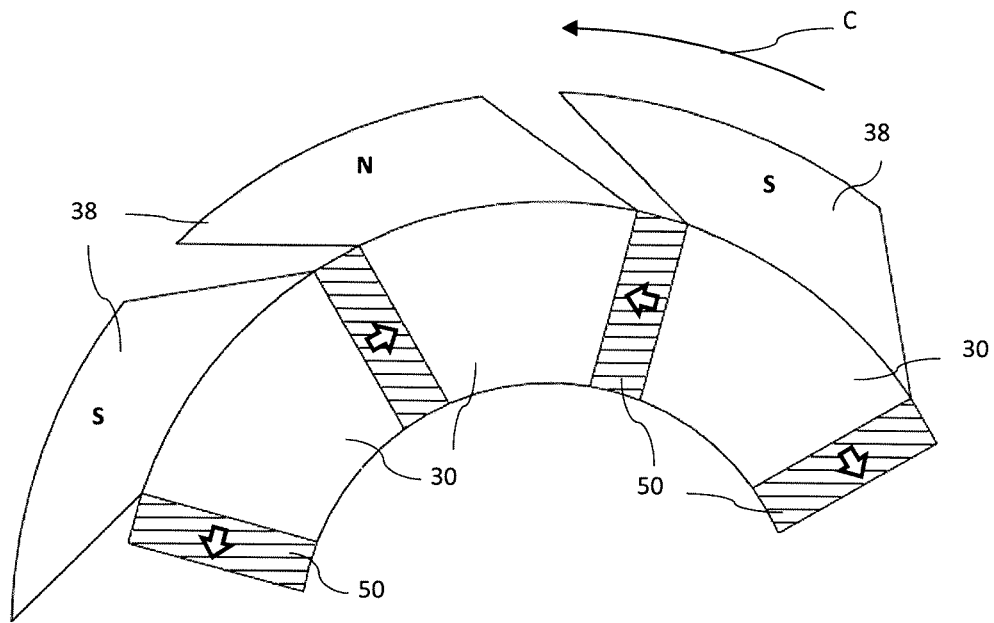
FIG. 8b shows a section view of the radial field internal rotor unit of FIG. 8a in which each pole shoe provides a circumferential offset of the external face of each pole piece in direction C.
Figure 8C:
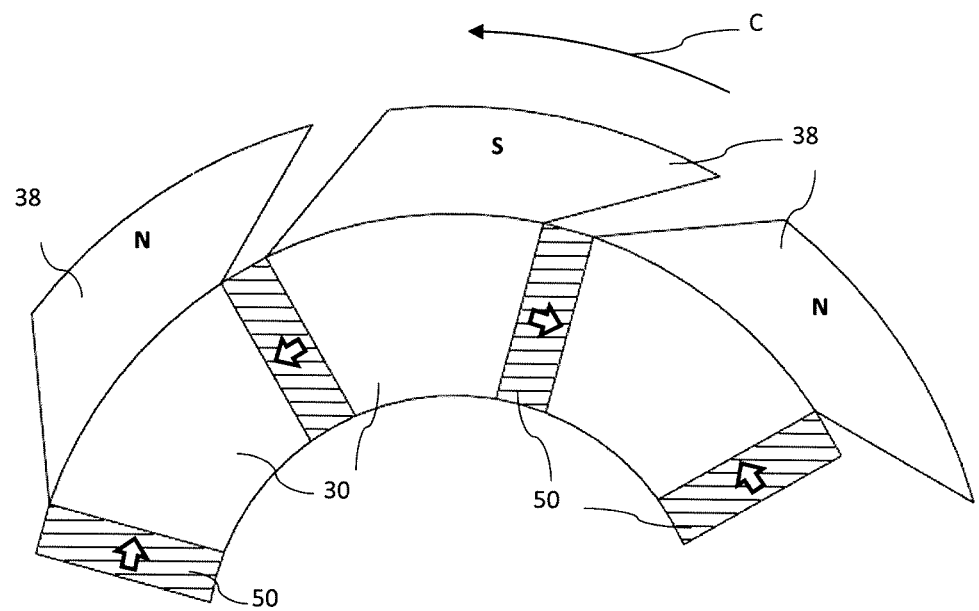
FIG. 8c shows a section view of the radial field internal rotor unit of FIG. 8a in which each pole shoe provides a circumferential offset of the external face of each pole piece opposite to direction C.

Embodiment depicted in FIG. 8*a* comprises a first axial source of magnetic flux 40, a second source of circumferential magnetic flux 50 and each magnetic pole piece 30 includes a pole shoe 38. Since magnetic pole pieces 30 belonging to two neighbouring rotor units 110*a* and 110*b* are connected by only one array of axially magnetized magnets 40, alternate south and north poles are formed in axial direction. The pole shoes 38 in FIG. 8 are used to offset pole face 38F with respect to the magnetic pole piece 30 in both circumferential and radial directions so that north and south poles created by the rotor units 110*a* and 110*b* are aligned. Axial alignment of poles can be either perfect or can have skewed. The partial axial cross-sectional views are shown in FIG. 8*b* and FIG. 8*c* for rotor units 110*a* and 110*b*, respectively. In the axial direction, alternate poles are created. Since the pole shoes are offset in the circumferential direction, the poles of neighbouring rotor units are aligned at the outer radius of the rotor, as depicted in FIG. 8*a*.

Each rotor unit 120 in this embodiment can have an array of radially magnetised magnets 60 (as shown in FIG. 2*b*) placed at the inner radius (below the magnetic pole piece 30 shown in FIG. 8) of the magnetic pole piece 30.

This would further improve the flux density in the air gap between rotor and stator.

FIG. 9*a* shows the radial field internal rotor unit 120 shown in FIG. 2*c* as part of an electrical machine. In addition to the radial field internal rotor unit 120 previously described the machine comprises a stator 200. Said stator 200 comprises a plurality of electro magnets 220. The plurality of electro magnets include a plurality of fingers 224 of the core 210 around which a plurality of coils 222 which can be supplied with electric current sit. The electromagnets 220 are disposed in a circumferential direction C around the axis of rotation X. FIG. 9*b* shows an axial section of the electric machine of FIG. 9*a*. The electric machine of FIG. 9*a* and FIG. 9*b* shows four electromagnets comprising four sets of coils, it will be appreciated that not all the electromagnets 220 of the particular embodiment of the electrical machine are shown in said figures. In further embodiments it is possible for the stator 200 to comprise any plurality of electromagnets 220.

FIG. 10*a* shows the radial field internal rotor unit 120 shown in FIG. 2*e* with the addition of a cut away view of the axially extending tubular structure 101, as part of an electrical machine. In addition to the radial field external rotor unit 120 previously described the machine comprises a stator 200. Said stator 200 comprises a plurality of electro magnets 220. The plurality of electro magnets comprise a plurality of fingers 224 of the core 210 around which a plurality of coils 222 which can be supplied with electric current sit. The electromagnets 220 are disposed in a circumferential direction C around the axis of rotation X. FIG. 10*b* shows an axial section of the electric machine of FIG. 10*a*. The electric machine of FIG. 10*a* and FIG. 10*b* shows four electromagnets comprising four sets of coils, it will be appreciated that not all the electromagnets 220 of the particular embodiment of the electrical machine are shown in said figures. In further embodiments it is possible for the stator 200 to comprise any plurality of electromagnets 220.

The invention claimed is:

1. A magnetic pole assembly, providing flux to an air gap, comprising:
   a plurality of magnetic pole pieces; and
   a plurality of sources of magnetic flux, wherein:
      each magnetic pole piece includes a first axial face, a second axial face, a first circumferential face, a second circumferential face, a radially inner surface, and a radially outer surface; and
      said plurality of sources of magnetic flux lie adjacent each of the first axial face, the second axial face, the first circumferential face, the second circumferential face, and one of the radially inner surface, or the radially outer surface, thereby to allow flux created by said sources of magnetic flux to enter the plurality of pole pieces which then focus the magnetic flux towards and out of the radial surface not having a source of magnetic flux adjacent thereto,
   wherein:
      the magnetic pole pieces are arranged in a circular array around an axis of rotation X to form a rotor unit having plurality of magnetic pole pieces;
      consecutive pole pieces in the circular array have alternating magnetic polarity;
      a first of said plurality of magnetic flux comprise individual circumferentially and radially extending first and second axial segments adjacent respective first and second axial faces; and
      the magnetic pole assembly further comprises first and second circumferentially extending magnetic end plates having a first face adjacent respective first and second segments providing a return path for flux generated by the axially magnetized magnets, thereby to guide flux in a three-dimensional fashion.

2. The magnetic pole assembly as claimed in claim 1, wherein at least one of:
   i) said plurality of sources of magnetic flux lie adjacent the radially inner surface of a respective magnetic pole piece but not said radially outer surface;
   ii) said plurality of sources of magnetic flux lie adjacent the radially outer surface of a respective magnetic pole piece but not said radially inner surface;
   iii) the plurality of sources of magnetic flux are permanent magnets; or
   iv) the sources of magnetic flux are electro-magnets comprising coils and a source of electric current for passage through said coils.

3. The magnetic pole assembly as claimed in claim 2, wherein and including a stator having a plurality of electro magnets disposed in a circumferential direction C around said axis of rotation X and having a radial surface facing the radially outer surface of said pole piece.

4. The magnetic pole assembly as claimed in claim 2, further comprising a stator having a plurality of electro magnets disposed in a circumferential direction C around said axis of rotation X and having a radial surface facing the radially inner surface of said pole piece.

5. The magnetic pole assembly as claimed in claim 1, wherein:
   a third of said one or more sources of magnetic flux comprise a plurality of individual circumferentially and axially extending first or second radial segments adjacent respective first or second radial faces.

6. The magnetic pole assembly as claimed in claim 5, further comprising an axially extending tubular structure of magnetic material extending between said plurality of individual circumferentially and axially extending first or second radial segments.

7. The magnetic pole assembly as claimed in claim 1, wherein at least one of:
   i) said first of said sources of magnetic flux comprise axially magnetized magnets having a north side N and a south side S displaced axially along axis of rotation X from each other;
   ii) said second of said sources of magnetic flux comprise circumferentially magnetized magnets having a north side N and a south side S displaced circumferentially around axis of rotation X relative to each other;
   iii) said third of said sources of magnetic flux comprise radially magnetized magnets having a north side N and a south side S displaced radially relative to each other;
   iv) said second and third sources of magnetic flux comprise a single unitary structure having a pair of said individual axially and radially extending first and second circumferential segments and a single axially and circumferentially extending radial segment.

8. The magnetic pole assembly as claimed in claim 1, wherein said first and third sources of magnetic flux comprise a single unitary structure having a pair of individual circumferentially and radially extending first and second axial segments and a single axially and circumferentially extending radial segment.

9. The magnetic pole assembly as claimed in claim 1, wherein said first and second sources of magnetic flux comprise a single unitary structure having a pair of circumferentially and radially extending first and second axial segments and a pair of axially and radially extending first and second circumferential segments.

10. The magnetic pole assembly as claimed in claim 1, wherein said first, second and third sources of magnetic flux comprise a single unitary stricture having a pair of individual circumferentially and radially extending first and second axial segments a pair of axially and radially extending first and second circumferential segments and a single axially and circumferentially extending radial segment.

11. The magnetic pole assembly as claimed in claim 1, wherein each pole piece includes a pole shoe extending away from a radial surface not having a radial source of magnetic flux adjacent thereto and wherein said pole shoe includes a pole face which is both radially and circumferentially offset relative to the pole piece.

12. A magnetic pole assembly, providing flux to an air gap, comprising:
a plurality of magnetic pole pieces; and
a plurality of sources of magnetic flux, wherein:
each magnetic pole piece includes a first axial face, a second axial face, a first circumferential face, a second circumferential face, a radially inner surface, and a radially outer surface; and
said plurality of sources of magnetic flux lie adjacent each of the first axial face, the second axial face, the first circumferential face, the second circumferential face, and one of the radially inner surface, or the radially outer surface, thereby to allow flux created by said sources of magnetic flux to enter the plurality of magnetic pole pieces which then focus the magnetic flux towards and out of the radial surface not having a source of magnetic flux adjacent thereto,
wherein:
the magnetic pole pieces are arranged in a circular array around an axis of rotation X to form a rotor unit having plurality of magnetic pole pieces;
consecutive pole pieces in the circular array have alternating magnetic polarity; and
wherein a second of said plurality of sources of magnetic flux comprise a plurality of individual axially and radially extending first and second circumferential segments adjacent respective first and second circumferential faces.

13. The magnetic pole assembly as claimed in claim 12, wherein at least one of:
i) said plurality of sources of magnetic flux lie adjacent the radially inner surface of a respective magnetic pole piece but not said radially outer surface;
ii) said plurality of sources of magnetic flux lie adjacent the radially outer surface of a respective magnetic pole piece but not said radially inner surface;
iii) the plurality of sources of magnetic flux are permanent magnets;
iv) the sources of magnetic flux are electro-magnets comprising coils and a source of electric current for passage through said coils.

14. The magnetic pole assembly as claimed in claim 12, wherein at least one of:
i) said first of said sources of magnetic flux comprise axially magnetized magnets having a north side N and a south side S displaced axially along axis of rotation X from each other;
ii) said second of said sources of magnetic flux comprise circumferentially magnetized magnets having a north side N and a south side S displaced circumferentially around axis of rotation X relative to each other;
iii) said third of said sources of magnetic flux comprise radially magnetized magnets having a north side N and a south side S displaced radially relative to each other;
iv) said second and third sources of magnetic flux comprise a single unitary structure having a pair of said individual axially and radially extending first and second circumferential segments and a single axially and circumferentially extending radial segment.

15. The magnetic pole assembly as claimed in claim 12, wherein said first and third sources of magnetic flux comprise a single unitary structure having a pair of individual circumferentially and radially extending first and second axial segments and a single axially and circumferentially extending radial segment.

16. The magnetic pole assembly as claimed in claim 12, wherein said first and second sources of magnetic flux comprise a single unitary structure having a pair of circumferentially and radially extending first and second axial segments and a pair of axially and radially extending first and second circumferential segments.

17. The magnetic pole assembly as claimed in claim 12, wherein said first, second and third sources of magnetic flux comprise a single unitary stricture having a pair of individual circumferentially and radially extending first and second axial segments a pair of axially and radially extending first and second circumferential segments and a single axially and circumferentially extending radial segment.

18. The magnetic pole assembly as claimed in claim 12, wherein each pole piece includes a pole shoe extending away from a radial surface not having a radial source of magnetic flux adjacent thereto and wherein said pole shoe includes a pole face which is both radially and circumferentially offset relative to the pole piece.

19. The magnetic pole assembly as claimed in claim 12, wherein and including a stator having a plurality of electro magnets disposed in a circumferential direction C around said axis of rotation X and having a radial surface facing the radially outer surface of said pole piece.

20. The magnetic pole assembly as claimed in claim 12, further comprising a stator having a plurality of electro magnets disposed in a circumferential direction C around said axis of rotation X and having a radial surface facing the radially inner surface of said pole piece.

* * * * *